(12) United States Patent
Kitano et al.

(10) Patent No.: US 6,724,317 B1
(45) Date of Patent: Apr. 20, 2004

(54) AUDIOVISUAL PLAYER SYSTEM

(75) Inventors: Toyoaki Kitano, Tokyo (JP); Ikuo Saga, Tokyo (JP); Masahiro Hibino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,961

(22) PCT Filed: Mar. 29, 2000

(86) PCT No.: PCT/JP00/01975

§ 371 (c)(1),
(2), (4) Date: Nov. 13, 2001

(87) PCT Pub. No.: WO01/72554

PCT Pub. Date: Oct. 4, 2001

(51) Int. Cl.⁷ .................................................. G08B 3/00
(52) U.S. Cl. .................................... 340/691.1; 340/461
(58) Field of Search ................................ 340/435, 436, 340/903, 904, 691.1, 461; 348/837, 291, 776; 296/37.7, 24.1

(56) References Cited

U.S. PATENT DOCUMENTS

| | | | | |
|---|---|---|---|---|
| 5,574,443 A | * | 11/1996 | Hsieh | 340/436 |
| 5,822,023 A | | 10/1998 | Suman et al. | 348/837 |
| 5,927,784 A | * | 7/1999 | Vitito | 296/37.7 |
| 5,946,055 A | * | 8/1999 | Rosen | 348/837 |
| 6,246,449 B1 | * | 6/2001 | Rosen | 348/837 |
| 6,292,236 B1 | * | 9/2001 | Rosen | 348/837 |
| 6,304,173 B2 | * | 10/2001 | Pala et al. | 340/461 |

FOREIGN PATENT DOCUMENTS

| | | |
|---|---|---|
| JP | A4-185547 | 7/1992 |
| JP | A4-324796 | 11/1992 |
| JP | Y2-2525949 | 11/1996 |
| JP | A9-104293 | 4/1997 |
| JP | A11-240389 | 9/1999 |

* cited by examiner

*Primary Examiner*—Van Trieu
(74) *Attorney, Agent, or Firm*—Birch, Stewart, Kolasch & Birch, LLP

(57) ABSTRACT

A visual-sound-reproducing system includes a display panel mounted on a ceiling of a cabin to reproduce a picture on a monitor screen; a moving mechanism moving the display panel toward a home-position that the monitor screen of the display panel is nearly parallel to a ceiling of a cabin of an automobile and a play-position that the monitor screen of the display panel faces rearward; and a visual-sound device providing information regarding visual and sound. The moving mechanism includes a rotational axis extending in a direction crossing a longitudinal direction of an automobile to support rotationally the display panel, a rotational means driving rotationally the display panel about the rotational axis, a guide member extending in the longitudinal direction of the automobile, and a rectilinear moving means moving reciprocally the display panel in the longitudinal direction of the automobile, the display panel being supported on the guide member to allow a slide of the display panel thereon.

18 Claims, 10 Drawing Sheets

FORWARD OF AUTOMOBILE

AUDIOVISUAL PLAYER SYSTEM

This application is the national phase under 35 U.S.C. § 371 of PCT International Application No. PCT/JP00/01975 which has an International filing date of Mar. 29, 2000, which designated the United States of America and was not published in English.

TECHNICAL FIELD

The invention relates to a visual-sound-reproducing system, which is mountable within a room (hereafter, referred as a cabin) of a mobile unit such as automobile and so on, for example.

BACKGROUND ART

In recent years, a display for operating a car-navigation soft or for looking behind for traffic when the automobile is rolling rearward is often mounted in the automobile. The display is generally placed on a dashboard to facilitate that a driver looks a picture reproduced on a monitor screen. The display is connected to a DVD (digital versatile disc) driving device operating the car-navigation soft, for example, and is placed near the driver's seat.

Incidentally, when a person sitting in a rear seat watches the picture such as cinema and so on using the display placed on the dashboard, a front seat or a silhouette of a passenger sitting in the front seat obstruct a part of the picture. In this way, the person sitting in the rear seat must eventually watch the picture through a clearance defined between front seats without keeping calm.

It is a known example that a display is placed in a cabin of the automobile to allow appreciation of the picture from the rear seat. FIG. 1 is a front view of a conventional example of a display for appreciation from a rear seat. In the drawing, a reference numeral 1 denotes a front seat, and a reference numeral 2 denotes a headrest. A pair of legs 3 of the headrest 2 are inserted into a pair of holes (not shown) formed at a top of the front seat 1, and the headrest 2 is mounted at the front seat 1 to allow reciprocal movement of the headrest 2 in vertical directions. A display panel 4 is mounted on a shoulder section of the front seat 1 close to a center of the cabin, and is fixed to the legs 3 of the headrest 2 using an arm 5.

The display 4 is mounted in a sedan-type automobile for example to provide very high-visibility to a passenger sitting in the rear seat. However, since the display 4 is placed at the shoulder section of the front seat 1, the positioning is low. When the display 4 is mounted in one box type automobile having three rows of seats including front, middle and rear seats for example, the middle seat obstructs the picture reproduced on the display 4. In this way, a person sitting in the rear seat as a third seat must eventually watch the picture through a clearance defined between middle seats, and there is a problem that it is impossible to watch it with keeping calm.

FIG. 2 is a perspective view of the other conventional example of a display for appreciation from a rear seat. In the drawing, a reference numeral 10 denotes a floor console, and a reference numeral 11 denotes a retractable lid allowing being lifted perpendicularly mounted on a rear section of the floor console 10. A display 12 is disposed at a rear face of the lid 11, and an operating section 13 operating the display 12 is arranged at the rear section of the floor console 10 which is covered with the lid 11.

However, since the display 12 is disposed at the floor console 10, the positioning is too low. When the display 12 is mounted in one box type automobile having three rows of seats for example, the middle seat obstructs the picture reproduced on the display 12. In this way, a person sitting in the rear seat as a third seat must eventually watch the picture through a clearance defined between middle seats, and there is a problem that it is impossible to watch comfortably it.

The invention was made to solve the foregoing problems, and an object of the invention is to provide a visual-sound-reproducing system allowing a comfortable appreciation of cinema in the rear seat of the one box type automobile having three rows of seats for example.

DISCLOSURE OF THE INVENTION

A visual-sound-reproducing system according to the invention comprises a display panel reproducing a picture on a monitor screen; a moving mechanism moving the display panel toward a home-position that the monitor screen of the display panel is nearly parallel to a ceiling of a cabin of an automobile and a play-position that the monitor screen of the display panel faces rearward; and a visual-sound device providing information regarding visual and sound. In this way, since the display panel at the play-position can be kept in a high position within the cabin, it is possible to ensure visibility of adequate level with respect to a picture reproduced on the display panel. Therefore, when a passenger sitting in the rear seat watches the picture reproduced on the display panel, the picture is not obstructed due to a front seat or a silhouette of a passenger sitting in the front seat. As a result, it is not necessary to watch the picture through a clearance defined between the front seats, and it is possible to watch comfortably it with keeping calm. When the display panel becomes unnecessary, the display panel is returned by the moving mechanism to the home-position. As a result, it is possible to ensure a rear visibility of the driver to offer a superior level of safety. It is possible to ensure a passage space, through which the passenger walks, in the one box type automobile having three rows of seats for example.

With the above arrangement, the moving mechanism may include a rotational means rotating the display panel at an angle defined between the play-position and the home-position, the display panel being supported rotationally on a support axis mounted on the ceiling of the cabin and extending in a direction crossing a longitudinal direction of the automobile. In this way, it is possible to open and close adjustably the display panel due to the rotational means. As a result, a passenger sitting in the rear seat can watch the picture reproduced on the display panel.

With the above arrangement, the moving mechanism may include a guide member mounted on the ceiling of the cabin and extending the longitudinal direction of the automobile; and a rectilinear moving means moving reciprocally the display panel along the guide member. In this way, since the display panel can be moved reciprocally in the longitudinal direction of the automobile, it is possible to select as appropriate a position best suited to watching the picture reproduced on the display panel due to the rectilinear moving means. When the system is mounted in the one box type automobile having three rows of seats for example, it is possible to provide a picture to passengers sitting in middle and rear seats or to provide exclusively it to only passengers sitting in the rear seat. Thus, with the system, since various features can be selected, it is possible to improve the usability of the system.

With the above arrangement, the moving mechanism may include a rotation-locking mechanism locking the display panel into the home-position, the display panel being supported rotationally on a support axis mounted on the ceiling of the cab in and extending in a direction crossing a longitudinal direction of the automobile. In this way, since the display panel can be fixed to the home-position due to a hand-operated rotation-locking mechanism, it is possible to provide a display unit at low prices. When the rotation-locking mechanism is released, the display panel is rotationally hanged from the ceiling of the cabin. As a result, the display panel can be easily changed to the play-position.

With the above arrangement, the moving mechanism includes a guide member mounted on the ceiling of the cabin and extending a longitudinal direction of the automobile; a support plate being reciprocally supported on the guide member and supporting the display panel; and a reciprocal movement-locking mechanism controlling over a reciprocal movement of the support plate with respect to the guide member, and the reciprocal movement-locking mechanism may have an engagement projection arranged at any one of the support plate and the guide member; at least two engagement depressions arranged at the other in the longitudinal direction of the automobile; and a biasing member biasing the engagement projection against the engagement depressions. In this way, since the reciprocal movement-locking mechanism is arranged, it is possible to select as appropriate a positioning of the support plate with respect to the guide member. As a result, it is possible to stop stepwise the display panel at a favorite position.

With the above arrangement, the moving mechanism may include a horizontal turn mechanism supports the display panel to allow an oscillation of the display panel in a lateral direction of the automobile when the display panel locates at the play-position. In this way, since the display panel can be manually oscillated in the lateral direction of the automobile, it is possible to select as appropriate a position best suited to watching the picture reproduced on the display panel. As a result, it is possible to improve the usability of the system. With a face-to-face rotational seat type characterized in that the front seat is rotationally mounted to face the rear seat, it is possible to change the oscillation angle of the display panel to substantially face forward or toward the front seat. As a result, passengers sitting in the front seats also can watch the picture reproduced on the display panel.

With the above arrangement, it may further comprise a control mechanism controlling the rotational means to return the display panel located at the play-position to the home-position when a transmission gear of the automobile shifts to a reverse gear. In this way, when the transmission gear of the automobile shifts to the reverse gear to move the automobile rearward, the display panel does not obstruct a rear visibility of the driver. As a result, it is possible to ensure an adequate level of safety.

With the above arrangement, it may further comprise a loudspeaker performing sonic reproduction regarding the picture reproduced on the display panel and a sound device providing information regarding sound to the loudspeaker. In this way, it is possible to watch the picture reproduced on the display panel while listening to a powerful sound reproduced by the loudspeaker.

With the above arrangement, the loudspeaker may include a front loudspeaker located at the front of a front seat and a rear loudspeaker located near a rear seat, and further comprising a control mechanism controlling an operation of the rear loudspeaker in response to open/close of the display panel. In this way, the rear loudspeaker is operated when the display panel is closed in the home-position, and is stopped when the display panel is opened in the play-position. As a result, it is possible to save power consumption of the system.

With the above arrangement, it may further comprise an indicator arranged near to the display panel, the indicator indicating operating conditions of the display panel. In this way, passengers sitting in the rear seats apart from the display panel also can grasp easily an operation of the display panel.

With the above arrangement, it may further comprise a wireless remote controller transmitting optical signals to control an operation of the display panel, and the indicator may be provided with a photoreceptor receiving the optical signals from the wireless remote controller. In this way, passengers sitting in the rear seats apart from the display panel can also operate adjustably the display panel to improve the usability of the system.

With the above arrangement, it may further comprise a wireless headphone performing sonic reproduction regarding the picture reproduced on the display panel, and the indicator may be provided with a transmitter transmitting optical signals including information regarding sound to the wireless headphone. In this way, passengers sitting in the rear seats apart from the display panel can also receive adjustably optical signals from the transmitter to improve the usability of the system.

With the above arrangement, the loudspeaker performing sonic reproduction regarding the picture reproduced on the display panel may include a front loudspeaker located at the front of a front seat and a rear loudspeaker located near a rear seat, and further comprising a control mechanism stopping an operation of the rear loudspeaker when the wireless headphone receives information regarding sound from a transmitter. In this way, since both of the rear loudspeaker and the wireless headphone are not operated at one time, it is possible to prevent properly interference of sound between the rear loudspeaker and the wireless headphone.

BRIEF DESCRIPTION OF THE DRAWINGS

FIG. 10A is a front view of the display and FIG. 10B is a plan view of the display.

BEST MODES FOR CARRYING OUT THE INVENTION

To explain the invention more in detail, the best modes of carrying out the invention will be described with reference to the accompanying drawings.

EMBODIMENT 1

Figure 1:
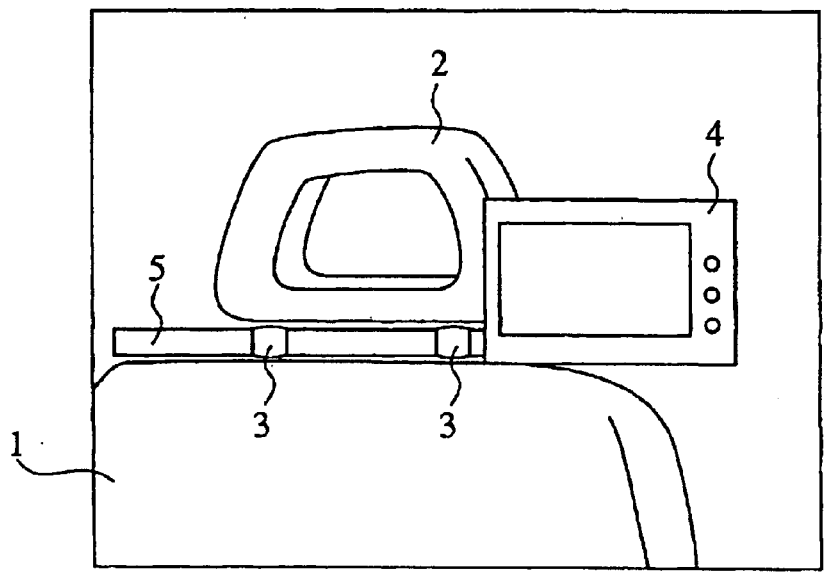
FIG. 1 is a front view of a conventional example of a display for appreciation from a rear seat.
Figure 2:
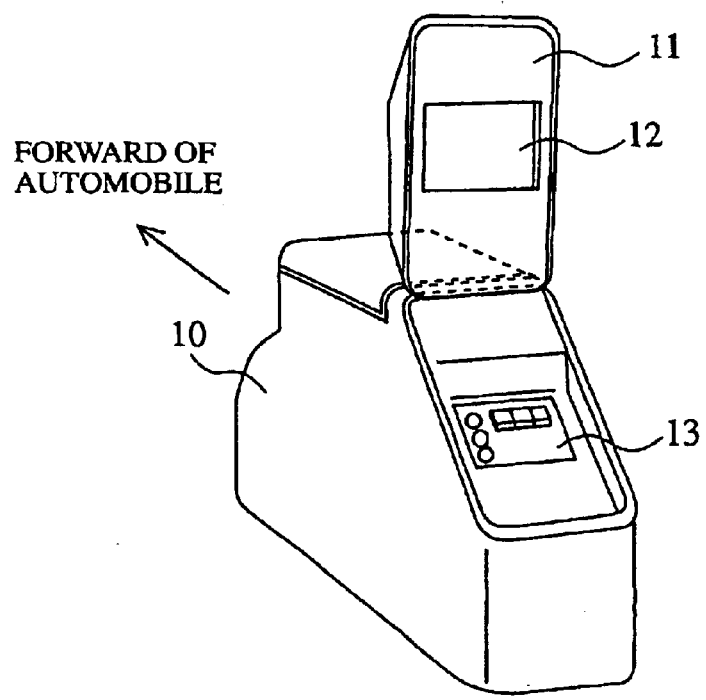
FIG. 2 is a perspective view of the other conventional example of a display for appreciation from a rear seat.
Figure 3:
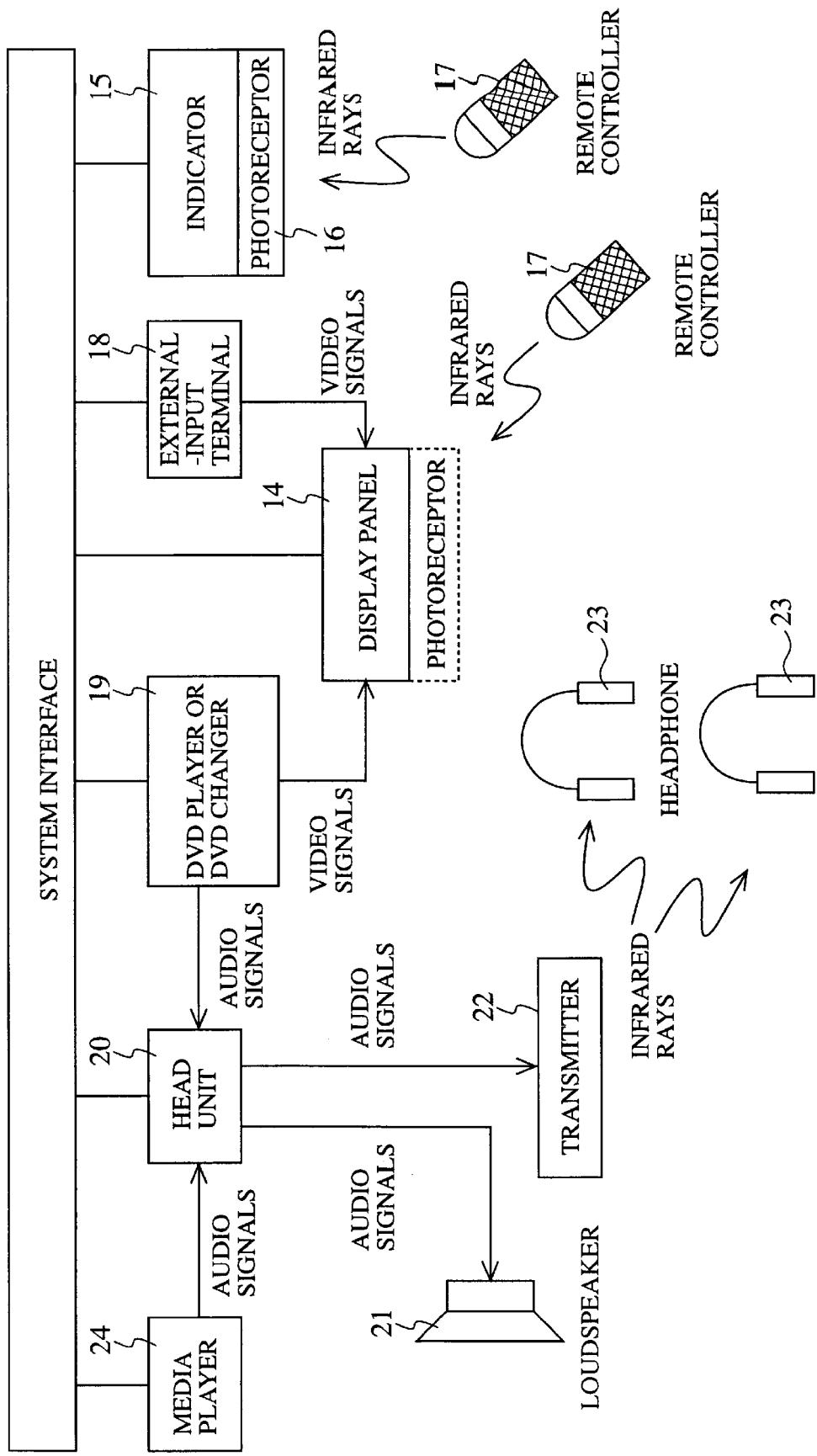
FIG. 3 is a block diagram of all constituents of a visual-sound-reproducing system as embodiment 1 according to the invention.

FIG. 3 is a block diagram of all constituents of a visual-sound-reproducing system as embodiment 1 according to the invention. In the drawings, a reference numeral 14 denotes a display panel, and a reference numeral 15 denotes an indicator arranged near the display panel 14 and indicating an operation of the display panel 14. A reference numeral 16 denotes a photoreceptor, a reference numeral 17 denotes a wireless remote controller, a reference numeral 18 denotes an external-input terminal, and a reference numeral 19 denotes a DVD player or a DVD changer. A reference numeral 20 denotes a head unit, a reference numeral 21 denotes a loudspeaker, a reference numeral 22 denotes a transmitter, a reference numeral 23 denotes a wireless or cordless headphone, and a reference numeral 24 denotes a media player.

With the visual-sound-reproducing system, it is possible to control an operation of the display panel 14 due to optical communications irradiating infrared rays from the wireless remote controller 17 to the photoreceptor 16 of the indicator 15. Moreover, the photoreceptor 16 may arrange at the display panel 14 instead of the indicator 15.

The display panel 14 is connectable to TV tuner or game equipment main body (not shown) for example through the external-input terminal 18. Pictorial soft of game is inputted as video signals from the game equipment main body to the display panel 14, and is outputted on a monitor screen of the display panel 14. The display panel 14 is connected to the DVD player or a DVD changer 19. Pictorial soft of the DVD is inputted as video signals to the display panel 14, and is outputted on the monitor screen of the display panel 14.

The head unit 20 is connected to the DVD player or a DVD changer 19. Sound soft of the DVD is inputted as audio signals to the head unit 20, and is outputted from the loudspeaker 21. The audio signals from the head unit 20 is simultaneously transmitted to a plurality of wireless headphones 23 through the transmitter 22 due to the optical communications using infrared rays. The head unit 20 is connected to the media player 24 such as a CD player or a MD player. Audio signals from the media player 24 is outputted to the loudspeaker 21 or the wireless headphone 23.

Figure 4:
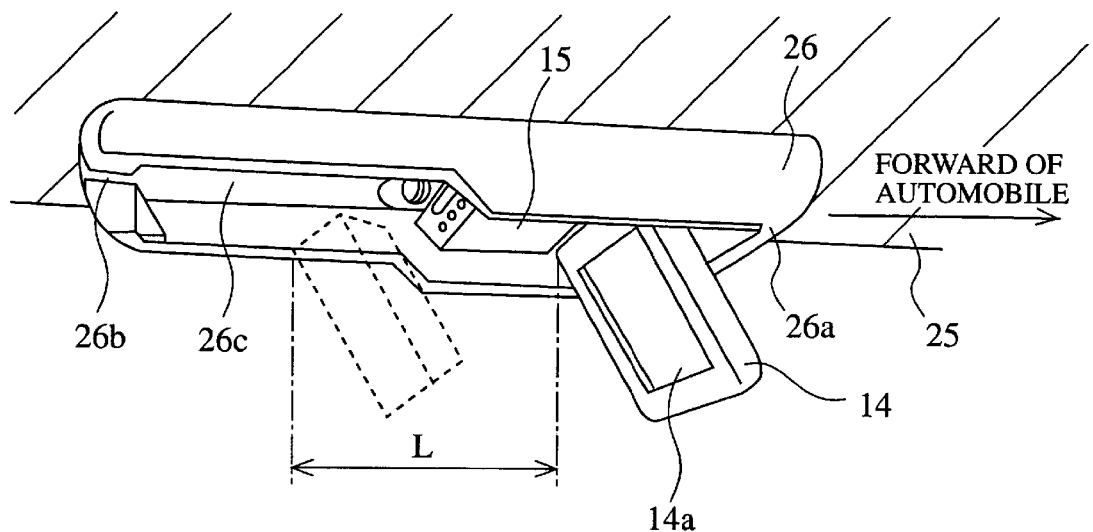
FIG. 4 is a perspective view of a display in the visual-sound-reproducing system shown in FIG. 3.

The display panel 14 in the visual-sound-reproducing system above is a slim visual reproducing device using a 10.4 inch-size liquid crystal or plasma device as shown in FIG. 4. The display panel 14 is housed in a cover 26 fixed on a ceiling 25 of the cabin to allow a rotational operation and a rectilinear operation of the display panel 14 in the longitudinal direction of the automobile. Here, the rotational operation in the longitudinal direction of the automobile means that the display panel 14 rotates in a vertical plane like a pendulum and that a component vector in the longitudinal direction of the automobile constitutes one of tangents to an arc indicating a trail of the rotation. A rotational range of the display panel 14 is defined between a state (home-position), in which the monitor screen 14a is nearly parallel to the ceiling 25 to be entirely housed in the cover 26, and a state (play-position), in which the monitor screen 14a faces rearward to facilitate appreciation of the passengers sitting in the rear seats. A range L of the rectilinear movement of the display panel 14 is determined as appropriate in consideration of size of the display panel 14 or the automobile.

The cover 26 is a slim rectangular box applicable to the one box type or station wagon type automobile having three rows of seats for example. The cover 26 includes an outer peripheral wall 26a having an U-letter shape in cross section including a front section, and both side sections of the automobile, a notch 26b formed at the outer peripheral wall 26a, and a recess 26c enclosed by the outer peripheral wall 26a and accommodating the display panel 14 and the indicator 15. The passengers sitting in the rear seats can watch picture of the display panel 14 or check indication of the indicator 15 through the notch 26b of the cover 26.

Figure 5:
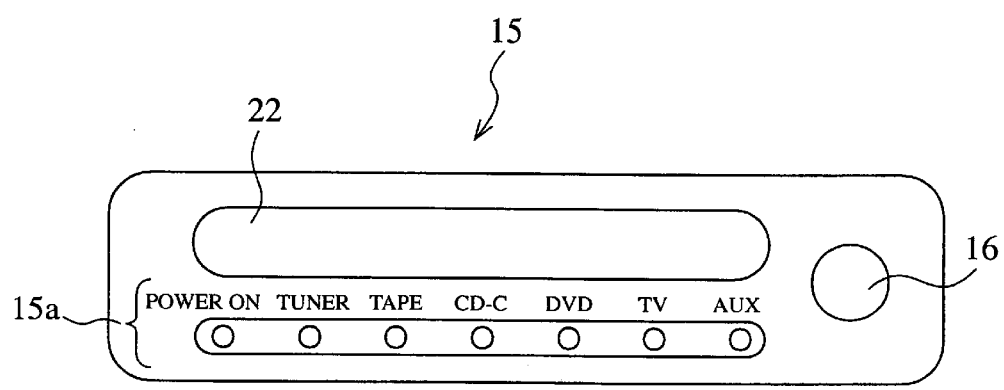
FIG. 5 is a front view of an indicator in the visual-sound-reproducing system shown in FIG. 3.

As shown in FIG. 5, an indication section 15a is arranged on the front of the indicator 15. On or off of a lamp of the indication section 15 notice operating conditions of the display panel 14, for example on or off of the power, or a visual and/or sound information supplier including the DVD player or a DVD changer 19, the media player 24 such as a CD player or a MD player or the TV tuner (not shown). The photoreceptor 16 receiving signals from the wireless remote controller 17 and the transmitter 22 transmitting the signals to the wireless headphone 23 are arranged on the front of the indicator 15. The wireless remote controller 17 can perform directions closing forcedly the display panel 14 and adjusting the positioning of the display panel 14.

Next, a constitution of the moving mechanism of the display panel 14 will be explained. The moving mechanism of the embodiment 1 includes the rectilinear moving means moving reciprocally the display panel 14 in the longitudinal direction of the automobile and the rotational means rotating the display panel 14 in the longitudinal direction thereof and in the vertical plane in cross section as described above.

1. Rectilinear Moving Means

Figure 6:
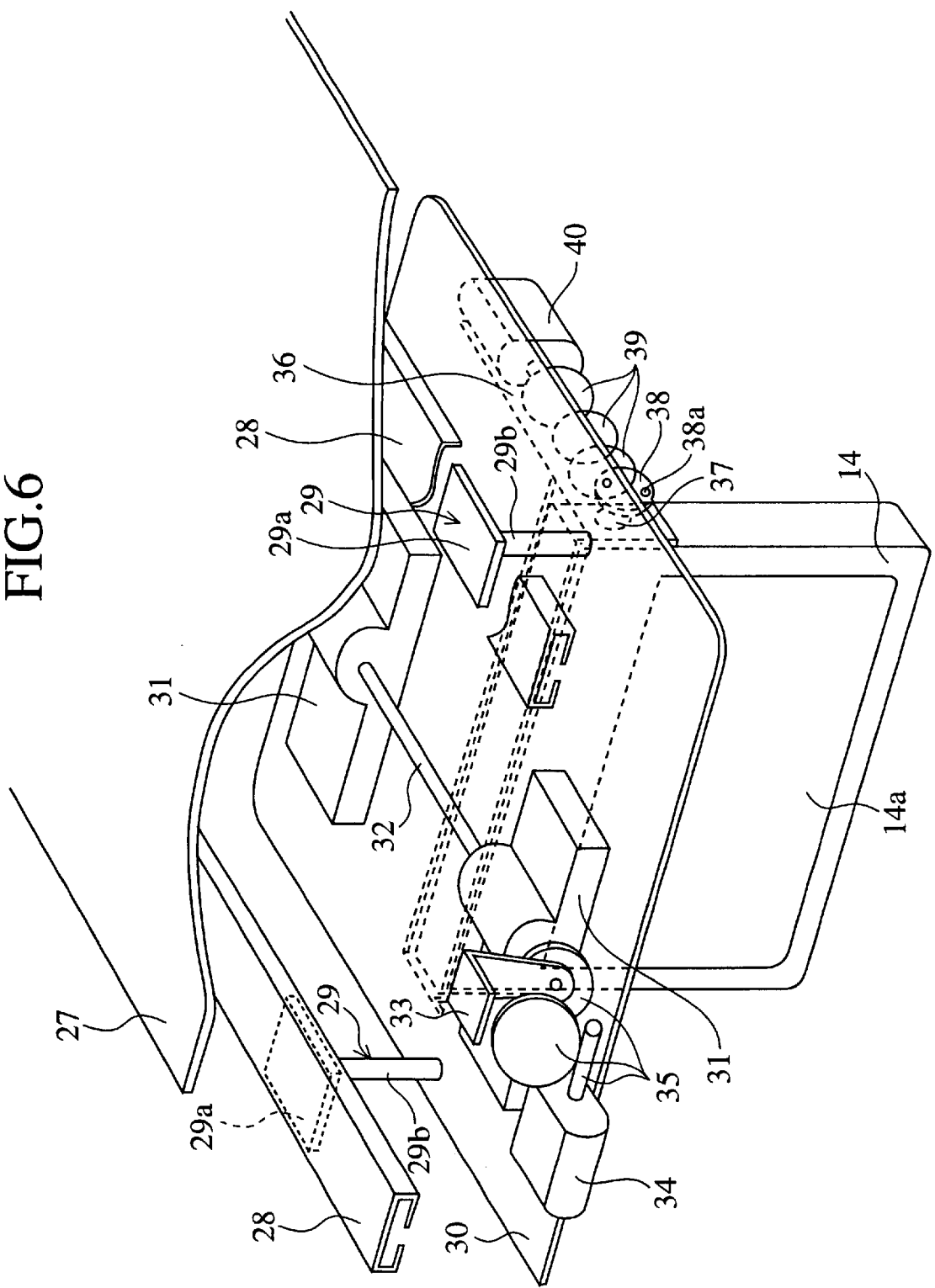
FIG. 6 is a perspective view of a moving mechanism, when the display is opened, in the visual-sound-reproducing system shown in FIG. 3.
Figure 7:
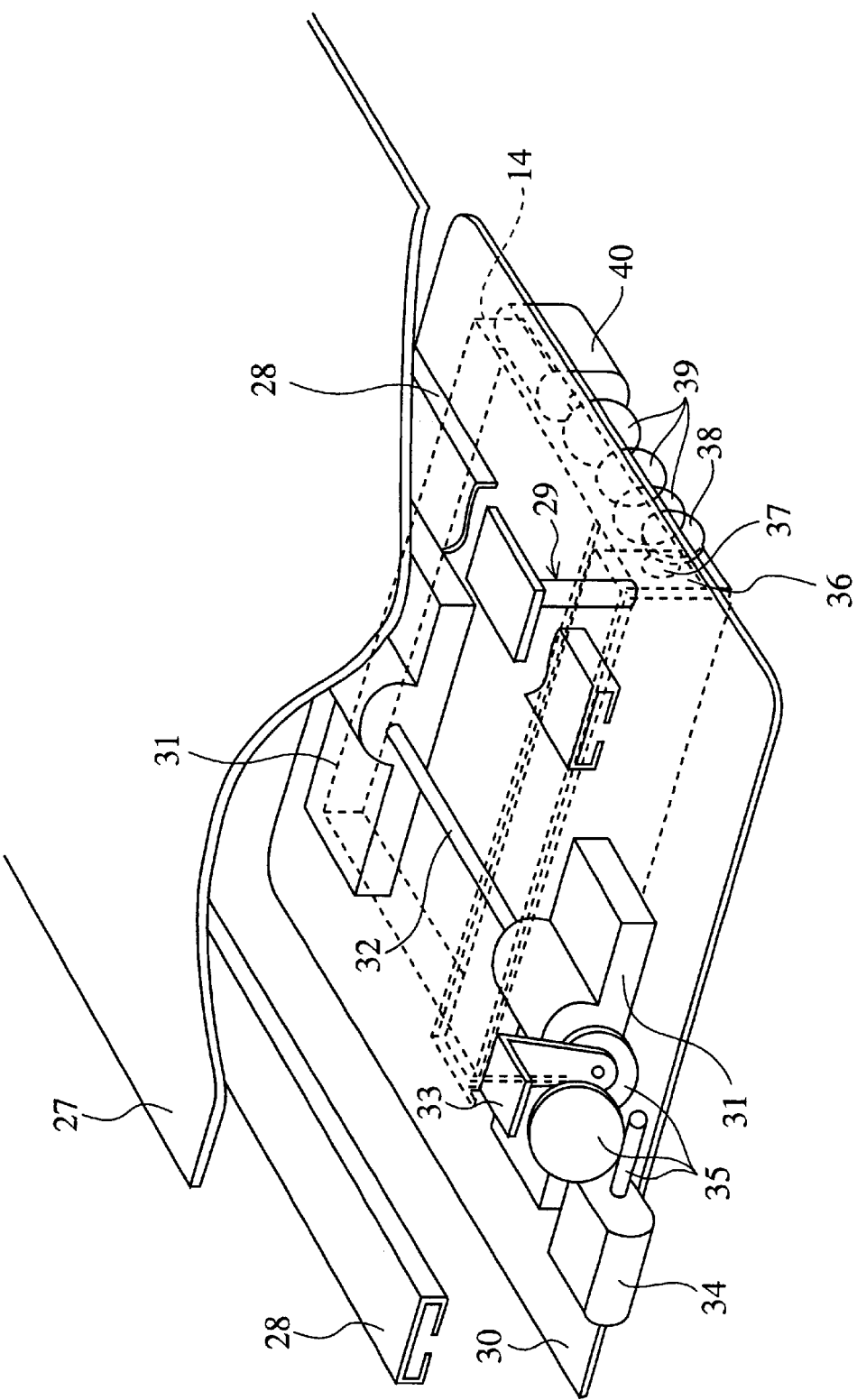
FIG. 7 is a perspective view of a moving mechanism, when the display is closed, in the visual-sound-reproducing system shown in FIG. 3.

A slim base plate 27 extending in the longitudinal direction of the automobile is fixed to a lower face of the ceiling 25 of the cabin as shown in FIG. 6 and FIG. 7. A pair of guide rails (guide member) 28 extending in the longitudinal direction of the automobile and parallel to each other are mounted on a lower face of the base plate 27. Each of the guide rails 28 has a C-letter shape in cross section opened downward. A coupling pole 29 allowing a reciprocal movement in the longitudinal direction of the automobile is mounted on each of the guide rails 28. An upper end 29a of the coupling pole 29 has a shape corresponding to a cross sectional shape of an inner space of the guide rail 28, and a lower end 29b is fixed on a sub-plate (support plate) 30 having a rectangular shape. In this way, the sub-plate 30 is movable in the longitudinal direction of the automobile and in the horizontal direction with respect to the base plate 27 due to the guide rails 28 and the coupling poles 29. A pair of holding tools 31 apart from to each other in the longitudinal direction of the automobile is mounted on an upper face of the sub-plate 30. A feed screw 32 is arranged between the holding tools 31. One end of the feed screw 32 is fixed rotationally to a holding plate 33 having an approximately L-letter shape fixed to the lower face of the base plate 27. A horizontal movement motor 34 and a driving force transferring mechanism 35, which feed a driving force to the feed screw 32, are mounted on the base plate 27.

The guide rails 28, the holding tool 31, the feed screw 32, the holding plate 33, the horizontal movement motor 34 and the driving force transferring mechanism 35 constitute the rectilinear moving means.

Next, an operation of the rectilinear moving means will be explained.

First, when the display panel 14 is in the play-position as shown in FIG. 6 and FIG. 7, the driving force of the horizontal movement motor 34 is transferred to the feed screw 32 through the driving force transferring mechanism 35. In this way, the sub-plate 30 providing with the holding tool 31 moves linearly forward or rearward due to a relationship between a screw and a nut. In this time, the sub-plate 30 can move smoothly in close to the ceiling 25 of the cabin due to the guide rails 28 and the coupling poles 29. To change directions of moving the sub-plate 30, it is necessary to change a rotational direction of the horizontal movement motor 34 or a transfer route of the driving force in the driving force transferring mechanism 35.

When the display panel 14 is in the home-position as shown in FIG. 7, the display panel 14 is not moved linearly because the long travel thereof can be not defined. However, when a long-body mobile unit, to which the visual-sound-reproducing system according to the invention is applied, has the three row of seats for example and the display panel 14 in the play-position is moved linearly from the front to the rear or reverse, the rear visibility of the driver through a room mirror and the passage space, through which the passenger walks, are limited. With this case, it is preferable to move linearly the display panel 14 in the home-position.

2. Rotational Means

A pair of hanging sections 36, which keeps a distance being slightly larger than a width of the display panel 14 and extends in the longitudinal direction of the automobile, is formed at a lower face of the sub-plate 30. A rotational axis 37 supporting rotationally an upper side of the display panel 14, a display-rotation gear 38 mounted co-axially on the rotational axis 37, and a display open/close motor 40 supplying a driving force to the display-rotation gear 37 through a driving force transferring mechanism 39 are mounted at the hanging sections 36, respectively. Moreover, a photo-coupler (not shown) is arranged at any one of an outer face of the hanging section 36 of the sub-plate 30 and an inner wall of the cover 26, and a position-sensing plate (not shown) is arranged at the other. The display-rotation gear 38 has a plurality of position-sensing holes 38a formed on a circle defined about the rotational axis 37. In this way, it is possible to detect a rotational position (angular degree) of the display panel 14.

The rotational axis 37, the display-rotation gear 38, the driving force transferring mechanism 39 and the display open/close motor 40 constitute the rotational means.

Next, an operation of the rotational means will be explained.

First, when the display panel 14 is in the play-position as shown in FIG. 6 and FIG. 7 and the display open/close motor 40 is operated, the driving force is transferred to the rotational axis 37 through the driving force transferring mechanism 39 and the display-rotation gear 38 to rotate the display panel 14. The rotation is continued until the monitor screen 14a of the display panel 14 as shown in FIG. 6 becomes nearly parallel to the ceiling 25 of the cabin as shown in FIG. 7. To change rotational directions of the display panel 14, it is necessary to change a rotation direction of the display open/close motor 40 or a transfer route of the driving force in the driving force transferring mechanism 35. The inclination of the display panel 14 in the play-position can be determined as appropriate in consideration of positioning of passengers or linear traveled distance.

Figure 8:
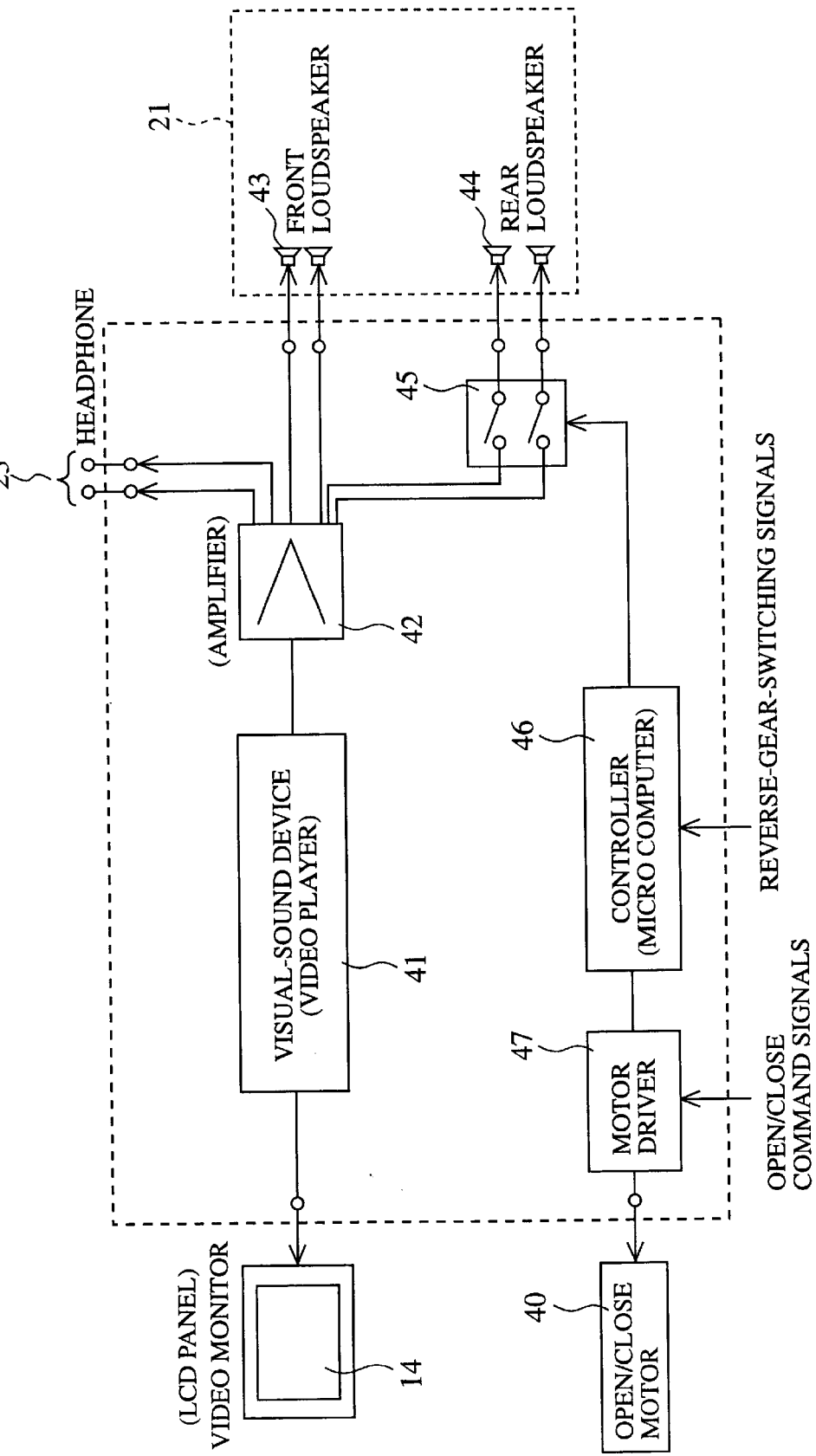
FIG. 8 is a schematic circuit diagram, which explains electrical isolation between front and rear loudspeakers in synchronization with open/close operation of the display in the visual-sound-reproducing system in FIG. 3.

With the visual-sound-reproducing system providing with the display panel 14 described above, a visual sound device 41, which includes a video player, a DVD player, a TV tuner or a navigation unit, is connected to the display panel 14 as shown in FIG. 8. The visual sound device 41 provides information regarding visual and/or sound (hereafter, referred as a visual sound information) to the display panel 14. The visual sound device 41 is connected in parallel to a front loudspeaker 43 and a rear loudspeaker 44 of the loudspeaker 21 through an amplifier 42. Connection between the amplifier 42 and the rear loudspeaker 44 can be switched off due to a switch 45, if necessary. The visual sound device 41 and the amplifier 42 can be disposed in anywhere in the cabin. Decentralization or concentration of arrangement of the devices may be performed in a space defined below seats for example, in consideration of the effective use of the cabin space or the usability of the devices.

A controller (control mechanism) 46 is connected to the switch 45, and is connected to the display open/close motor 40 through a motor driver 47. When the controller 46 receives open/close command signals instructing open/close of the display panel 14, the controller 46 can switch on/off of the rear loudspeaker 44 through the switch 45 and can control open/close of the display panel 14 through the display open/close motor 40. That is, since the controller 46 switches on/off of the rear loudspeaker 44 according to the open/close of the display panel 14, it is possible to control selectively sound fields of the front and rear seats due to the open/close of the display panel 14.

When the automobile is usually moved rearward, the driver shifts a transmission gear of the automobile to a reverse gear. The controller 46 can close the display panel 14 due to reverse-gear-switching signals to ensure a rear visibility of the driver. The controller 46 can also switch off the rear loudspeaker 44 to reduce produced in a rearward area of the automobile in consideration of ensuring maximum safety during operation.

When the cordless headphone 23 is used in the rear seat, the controller 46 switches off the rear loudspeaker 44. In this way, it is possible to prevent properly interference of sound between the rear loudspeaker 44 and the cordless headphone 23.

Next, an operation of the visual-sound-reproducing system as the embodiment 1 will be explained.

Figure 9:
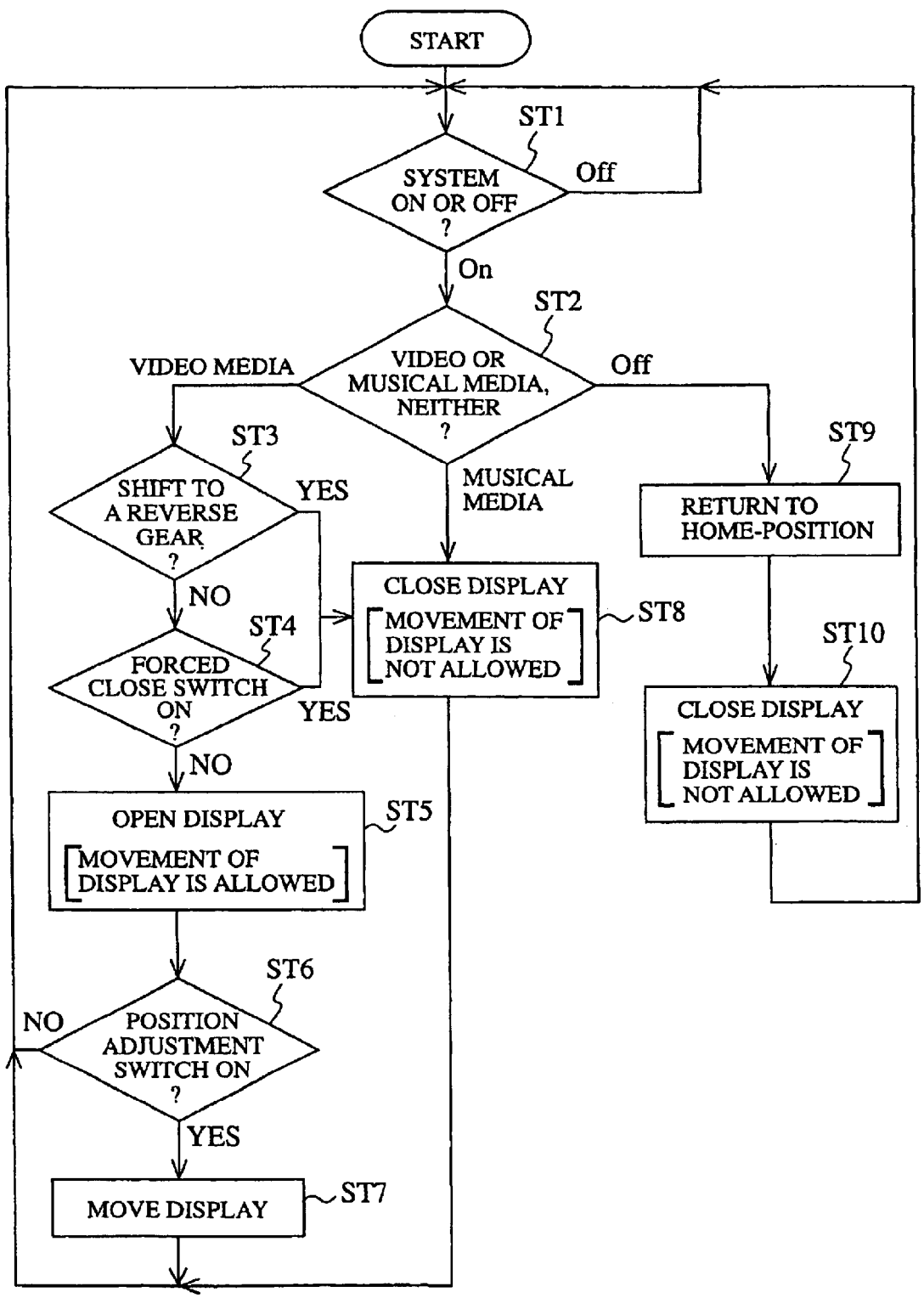
FIG. 9 is a flowchart, which explains an operation regarding the visual-sound-reproducing system shown in FIG. 3.

First, when the system is operated as shown in FIG. 9 (step ST1), the operator determines whether information reproduced by the system is video media or musical media or neither (step ST2). When the information is the video media, the operator determines whether the reverse-gear-switching signals produce or not (step ST3). When the reverse-gear-switching signals are not produced (step ST4) and a forced-close-switch is not switched on, the controller 46 controls the display open/close motor 40 through the motor driver 47 to open the display panel 14 to shift it to the play-position (step ST5). With this state, the rectilinear movement of the display panel 14 is allowed. Here, when a position-adjustment-switch is switched on (step ST6), the controller 46 moves linearly the display panel 14 to adjust the position thereof (step ST7). When the position-adjustment-switch is switched off, the picture can be reproduced on the display panel 14 there.

When information reproduced by the system is musical media (step ST2) and the reverse-gear-switching signals produce (step ST3) or the forced-close-switch is switched on (step ST4), the controller 46 controls the display open/close motor 40 through the motor driver 47 to close the display panel 14. That is, the display panel 14 shifts it to the home-position (step ST8).

When information reproduced by the system is neither of the video media or the musical media (step ST2), the controller 46 returns the display panel 14 to the home-position (step ST9). The controller 46 controls the display open/close motor 40 through the motor driver 47 to close the display panel 14 (step ST10).

As described above, according to the embodiment 1, the rotational means can shift the display panel 14 to the play-position or the home-position. In this way, the display panel 14 can be housed in a space of the ceiling when the display panel 14 is not used or when the automobile is moved rearward. It is possible to ensure a rear visibility of the driver and a walking-through space.

With the embodiment 1, it is possible for passengers sitting in the rear seats to select a position best suited to watching the picture reproduced on the display panel due to the rectilinear moving means. In this way, it is possible to improve the high-usability of the system.

EMBODIMENT 2

Figure 10B:
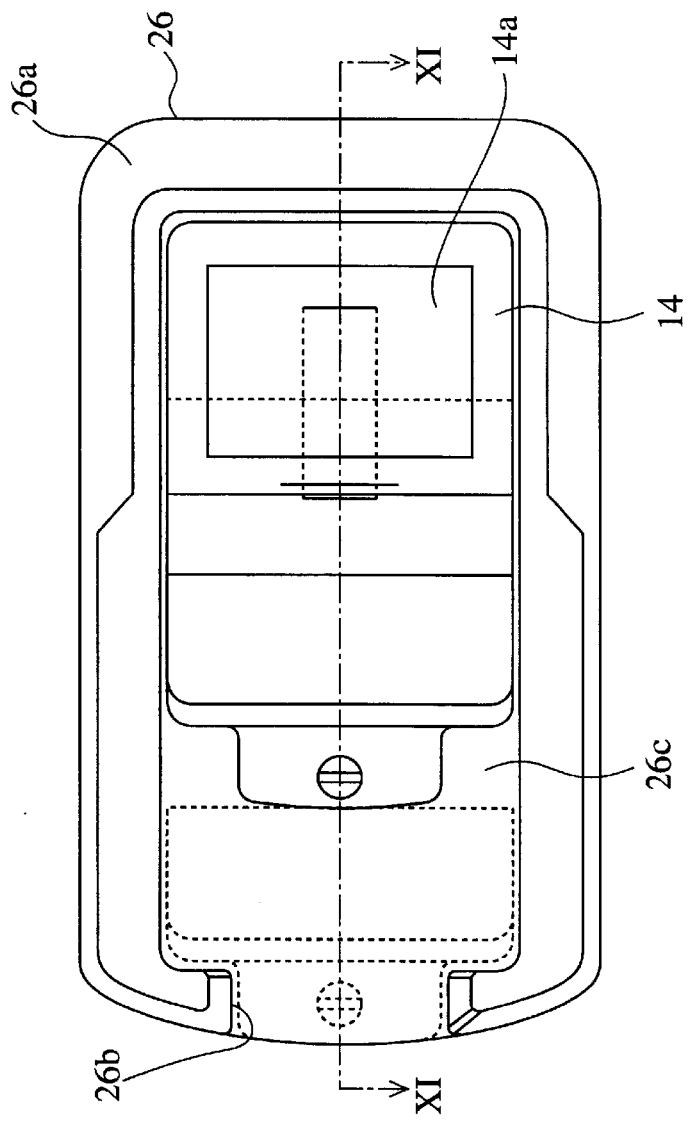
FIG. 10A and FIG. 10B are views of a display in a visual-sound-reproducing system as embodiment 2 according to the invention, respectively.
Figure 10A:
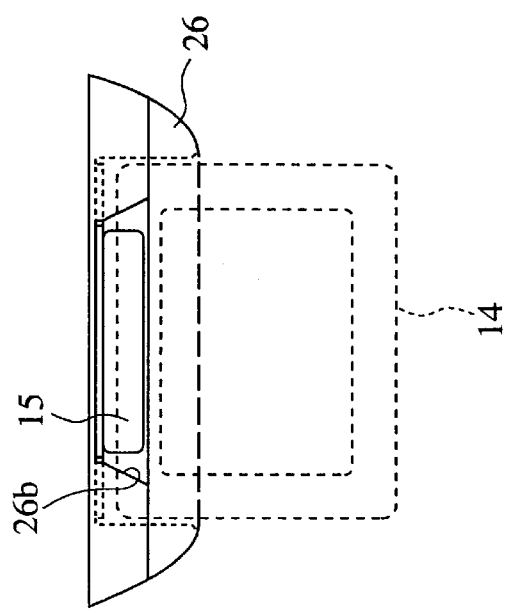
Figure 11:
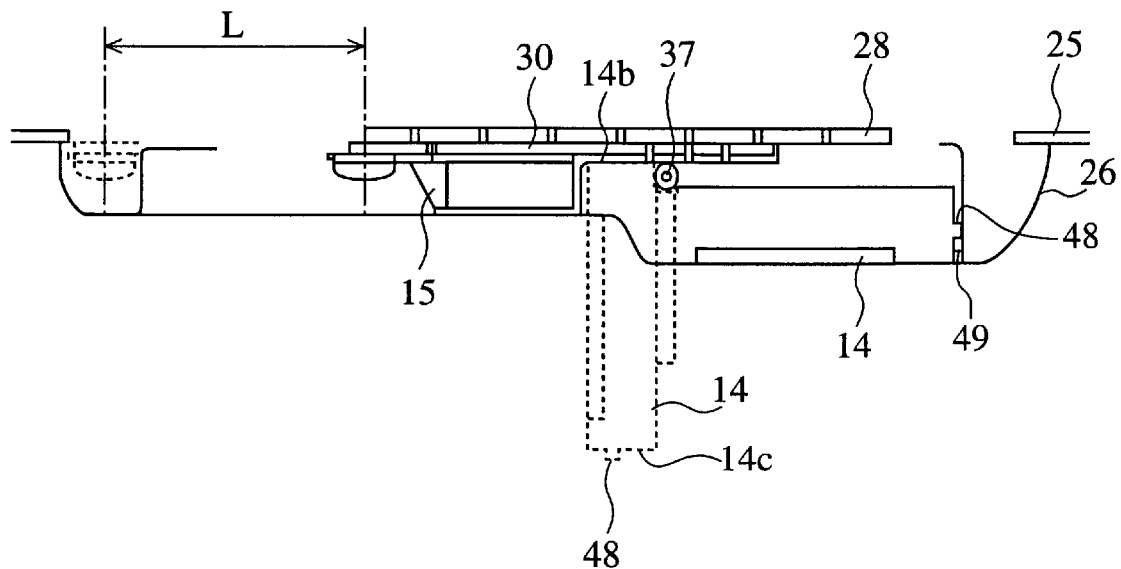
FIG. 11 is a cross sectional view taken along lines XI–XI of FIG. 10B.

FIG. 10A to FIG. 15 are views of a main point of a visual-sound-reproducing system as embodiment 2 according to the invention, respectively. FIG. 10A is a front view of the display and FIG. 10B is a plan view of the display. FIG. 11 is a cross sectional view taken along lines XI—XI of FIG. 10B. Components of the embodiment 2 common to the previous embodiment 1 are denoted by the same reference numerals and further description will be omitted.

The embodiment 2 is characterized in that the display panel 14 is moved rotationally or linearly due to a hand-operation.

A moving mechanism regarding the rotational movement of the display panel in the embodiment 2 will be explained. The display panel 14 is mounted rotationally on the lower face of the sub-plate 30 due to the rotational axis 37. An engagement section 48 is formed at a lower face 14c of the display panel 14. An engagement section 49, with which the engagement section 48 engages when the display panel 14 returns to the home-position, is formed at an inner face of the outer peripheral wall 26a of the cover 26. These engagement sections 48 and 49 constitute a rotation-locking mechanism locking the display panel 14 into the home-position.

An engagement-release means (not shown) may include a means moving any one of the engagement sections 48 and 49 or a means moving relatively them, and the engagement-release means is not limited to these examples.

As the engagement is released due to the engagement-release means, the display panel 14 is swung rearward of the automobile due to gravity and is rotated about the rotational axis 37. Here, since an upper face 14b of the display panel 14 comes into contact with the lower face of the sub-plate 30, further rotation is limited and the display panel 14 is finally hanged in a vertical position.

Figure 12:
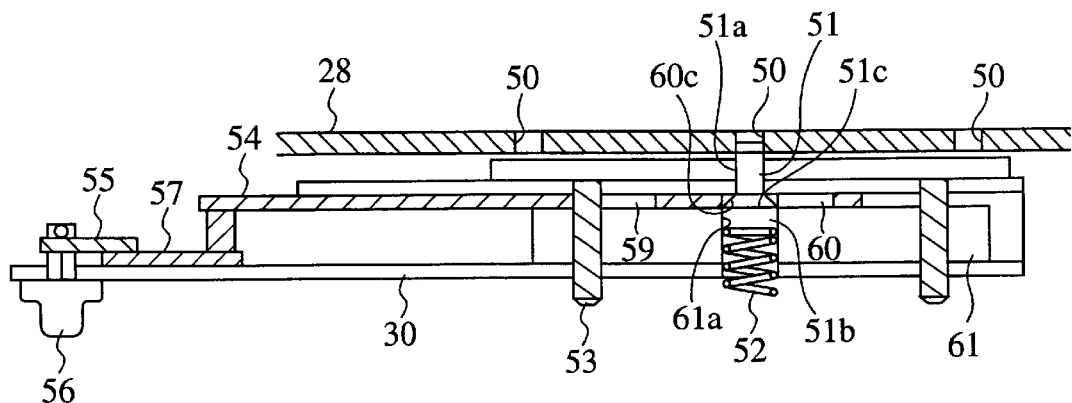
FIG. 12 is a side view of a locking mechanism (locked state) of the display shown in FIG. 11.
Figure 13:
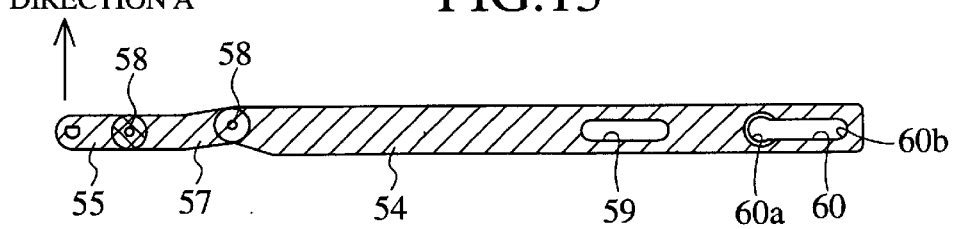
FIG. 13 is a plan view of FIG. 12.
Figure 14:
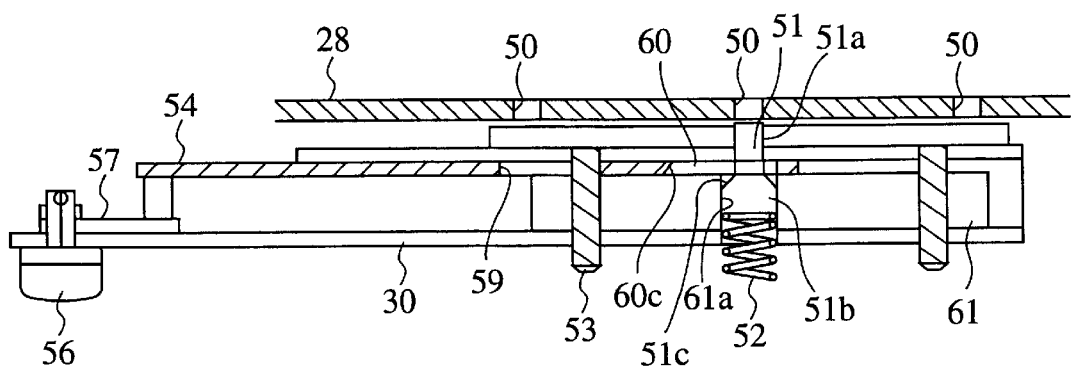
FIG. 14 is a side view of the locking mechanism (unlocked state) of the display shown in FIG. 11.
Figure 15:
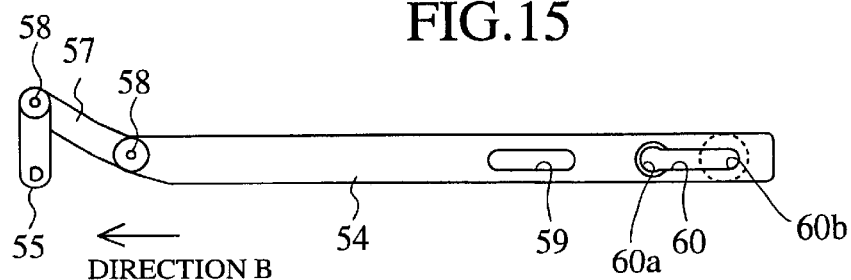
FIG. 15 is a plan view of FIG. 14.

Next, a moving mechanism regarding the rectilinear movement of the display panel in the embodiment 2 will be explained. FIG. 12 is a side view of a locking mechanism (locked state) of the display shown in FIG. 11, and FIG. 13 is a plan view of FIG. 12. FIG. 14 is a side view of the locking mechanism (unlocked state) of the display shown in FIG. 11, and FIG. 15 is a plan view of FIG. 14.

In the drawings, a reference numeral 50 denotes a plurality of lock holes (engagement depression) formed at the guide rails 28 in a direction (longitudinal direction of automobile) of reciprocal movement of the sub-plate 30 at regular intervals. A reference numeral 51 denotes a lock pin (engagement projection), which is formed at the sub-plate 30, allowing engagement with the lock holes 50. A reference numeral 52 denotes a coil spring (biasing member) biasing upward the lock pin 51 against the lock hole 50 at all times. A reference numeral 53 denotes a fixed pin fixed vertically on the sub-plate 30. A reference numeral 54 denotes a long arm, and a reference numeral 55 denotes a short arm allowing direct rotation due to a knob 56. A reference numeral 57 denotes a connecting arm connecting rotationally the long arm 54 to the short arm 55 due to a screw 58. A reference numeral 59 denotes a guide hole, which is formed at the long arm 54, guiding the fixed pin 53 inserted therein to regulate a range of movement of the long arm 54. A reference numeral 60 denotes an insertion hole, which is formed at the long arm 54, allowing insertion of the lock pin 51. A reference numeral 61 denotes a spacer, which is disposed between the sub-plate 30 and the long arm 54, having a hole 61a accommodating the lock pin 51 and the coil spring 52.

The lock pin 51 includes a minor diameter section 51a allowing insertion into the lock holes 50 of the guide rails 28, a major diameter section 51b having an outer diameter larger than the minor diameter section 51a, and a slope-shoulder-shaped section 51c connecting the major diameter section 51b to the minor diameter section 51a. The insertion hole 60 is an oblong figure and includes a major diameter circle section 60a allowing insertion of the major diameter section 51b of the lock pin 51, and a minor diameter circle section 60b, which extends from the major diameter circle section 60a to a base end of the long arm 54, preventing insertion of the major diameter section 51b of the lock pin 51. A slope-peripheral section 60c having a diameter increasing from an upper portion to a lower portion is formed at a part of an edge of the major diameter circle section 60a of the insertion hole 60. The lock hole 50, the lock pin 51 and the coil spring 52 constitute a reciprocal movement-locking mechanism.

Next, an operation will be explained.

First, when the knob 56 takes a posture extending in the lateral direction of the automobile as shown in FIG. 12 and FIG. 13, the long arm 54, the connection arm 57 and the short arm 55 are arranged linearly in the longitudinal direction of the automobile. At this time, the lock pin 51 biased upward at all times due to the coil spring 52 moves upward within the insertion hole 60 of the long arm 54. The minor diameter section 51a of the lock pin 51 is inserted into and engaged with the lock hole 50, and simultaneously the slope-shoulder-shaped section 51c of the lock pin 51 comes into contact with the slope-peripheral section 60c of the lock hole 50. In this way, it is possible to prevent the lock pin 51 from moving upward, against a biasing force of the coil spring 52. With thus state, the sub-plate 30 is not movable with respect to the guide rails 28, and the movement of the display panel 14 fixed on the sub-plate 30 also is blocked. The fixed pin 53 comes into contact with a part of the guide hole 59 close to a front end of the long arm 54.

Next, to release the engagement between the lock hole 50 and the lock pin 51 to move freely the sub-plate 30 with respect to the guide rails 28, as shown in FIG. 14 and FIG. 15, the knob 56 is turned in a clockwise direction until the time when the fixed pin 53 comes into contact with the part of the guide hole 59 close to the front end of the long arm 54. As a result, the short arm 55 is turned about 90 degrees in a direction indicated by arrow A (see FIG. 13), and the long arm 54 connected with the connection arm 57 moves linearly in a direction indicated by arrow B (see FIG. 15). Since the slope-shoulder-shaped section 51c of the lock pin 51 comes into contact with the edge of the insertion hole 60 of the long arm 54, the lock pin 51 moves downward relative to the insertion hole 60 with the linear movement of the long arm 54. In this way, the engagement between the minor diameter section 51a of the lock pin 51 and the lock hole 50 is released. Simultaneously, the slope-shoulder-shaped section 51c of the lock pin 51 comes into contact with a lower edge of the minor diameter circle section 60b of the insertion hole 60 to prevent the lock pin 51 from moving upward. Thus, when the sub-plate 30 is movable freely with respect to the guide rails 28, the knob 56 is pulled or pressed along the guide rails 28 to move the sub-plate 30. The lock pin 51 is then engaged with the lock hole 50, which is different from the lock hole 50 described above, to fix the display panel 14 at that position.

As described above, according to the embodiment 2, since the display panel 14 is moved rotationally or linearly due to the hand-operation, it is unnecessary to use electrical devices such as a driving motor and so on, and it is possible to provide a system at low prices.

EMBODIMENT 3

Figure 16:
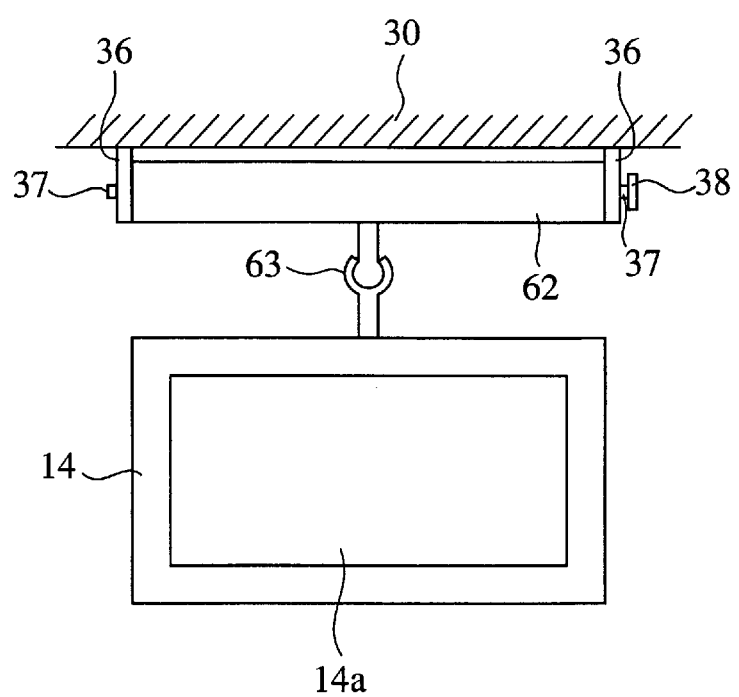
FIG. 16 is a front view of a display in a visual-sound-reproducing system as embodiment 3 according to the invention.

FIG. 16 is a front view of a display in a visual-sound-reproducing system as embodiment 3 according to the invention. Components of the embodiment 3 common to the previous embodiment 1 are denoted by the same reference numerals and further description will be omitted.

The embodiment 3 is characterized by having a horizontal turn mechanism allowing an oscillation of the display panel 14 in the lateral direction of the automobile. That is, a turn plate 62 is rotationally arranged between a pair of the hang sections 36 of the sub-plate 30. A roller bearing (horizontal turn mechanism) 63 connects the turn plate 62 with the display panel 14. In this way, it is possible to oscillate the display panel 14 in the lateral direction of the automobile. With the embodiment 3, a mechanism oscillating the display panel 14 due to the hand-operation is used. Alternatively, the mechanism may be automated by using electrical devices such as a driving motor and so on.

As described above, according to the embodiment 3, the display panel 14 in the play-position is determined so as to face rearward of the automobile. Alternatively, the display panel 14 may be oscillated according to a passenger's seat if necessary to facilitate appreciation of the picture.

INDUSTRIAL APPLICABILITY

According to the invention, it is possible for passengers sitting in rear seats to enjoy information regarding visual and sound due to a display hanged from a ceiling of a cabin. If unnecessary, it is possible to rotate upward the display panel toward the ceiling to ensure a headspace of the cabin.

What is claimed is:

1. A visual-sound-reproducing system, comprising:
display panel for reproducing a picture on a monitor screen;
a moving mechanism for moving the display panel toward a home-position that the monitor screen is nearly parallel to a ceiling of a cabin of an automobile and a play-position that the monitor screen of the display panel faces rearward;
a visual-sound device providing information regarding visual and sound; and
wherein the moving mechanism includes a guide member mounted on the ceiling of the cabin and extending the longitudinal direction of the automobile, and a rectilinear moving means for moving reciprocally the display panel along the guide member including during operation of the display panel.

2. A visual-sound-reproducing system according to claim 1, wherein the moving mechanism includes a rotational means rotating the display panel at an angle defined between the play-position and the home-position, the display panel being supported rotationally on a support axis mounted on the ceiling of the cabin and extending in a direction crossing a longitudinal direction of the automobile.

3. A visual-sound-reproducing system according to claim 2, further comprising a control mechanism controlling the rotational means to return the display panel located at the play-position to the home-position when a transmission gear of the automobile shifts to a reverse gear.

4. A visual-sound-reproducing system according to claim 1, wherein the moving mechanism includes a rotation-locking mechanism locking the display panel into the home-position, the display panel being supported rotationally on a support axis mounted on the ceiling of the cabin and extending in a direction crossing a longitudinal direction of the automobile.

5. A visual-sound-reproducing system according to claim 1,
wherein the moving mechanism includes a guide member mounted on the ceiling of the cabin and extending a longitudinal direction of the automobile; a support plate being reciprocally supported on the guide member and supporting the display panel; and a reciprocal movement-locking mechanism controlling over a reciprocal movement of the support plate with respect to the guide member, and
wherein the reciprocal movement-locking mechanism has an engagement projection arranged at any one of the support plate and the guide member; at least two engagement depressions arranged at the other in the longitudinal direction of the automobile; and a biasing member biasing the engagement projection against the engagement depressions.

6. A visual-sound-reproducing system according to claim 1, wherein the moving mechanism includes a horizontal turn mechanism supports the display panel to allow an oscillation of the display panel in a lateral direction of the automobile when the display panel locates at the play-position.

7. A visual-sound-reproducing system according to claim 1, further comprising a loudspeaker performing sonic reproduction regarding the picture reproduced on the display panel and a sound device providing information regarding sound to the loudspeaker.

8. A visual-sound-reproducing system according to claim 7, wherein the loudspeaker includes a front loudspeaker located at the front of a front seat and a rear loudspeaker located near a rear seat, and further comprising a control mechanism controlling an operation of the rear loudspeaker in response to open/close of the display panel.

9. A visual-sound-reproducing system according to claim 1, further comprising an indicator arranged near to the display panel, the indicator indicating operating conditions of the display panel.

10. A visual-sound-reproducing system according to claim 9, further comprising a wireless remote controller transmitting optical signals to control an operation of the display panel, and wherein the indicator is provided with a photoreceptor receiving the optical signals from the wireless remote controller.

11. A visual-sound-reproducing system according to claim 9, further comprising a wireless headphone performing sonic reproduction regarding the picture reproduced on the display panel, and wherein the indicator is provided with a transmitter transmitting optical signals including information regarding sound to the wireless headphone.

12. A visual-sound-reproducing system according to claim 11, further comprising:
- a loudspeaker for performing sonic reproduction regarding the picture reproduced on the display panel and a sound device providing information regarding sound to the loudspeaker wherein the loudspeaker including a front loudspeaker located at the front of a front seat and a rear loudspeaker located near a rear seat; and
- a control mechanism for stopping an operation of the rear loudspeaker when the wireless headphone receives information regarding sound from a transmitter.

13. A display system, comprising:
- a display for displaying a video signal; and
- a mechanism for moving the display toward a first position substantially parallel to a ceiling of a vehicle and a second position facing rearward wherein said mechanism includes a first device for moving said display in a direction substantially parallel to said ceiling including during operation of the display.

14. The display system of claim 13, wherein said mechanism includes a second device for rotating the display between said first and second position using a support axis arranged substantially perpendicular to a longitudinal direction of said vehicle.

15. The display system of claim 13, wherein said mechanism includes a second device for rotating said display between said second position and a third position facing frontward using a support axis arranged substantially perpendicular to the ceiling of said vehicle.

16. A method for displaying a video signal, comprising:
- transmitting video signals to a display for viewing; and
- providing a mechanism for moving said display toward a first position substantially parallel to a ceiling of a vehicle and a second position facing rearward wherein said mechanism includes a first device for moving said display in a direction substantially parallel to said ceiling while in said first position or said second position including during operation of the display.

17. The method of claim 16, wherein said providing includes providing said mechanism including a second device for rotating the display between said first and second position using a support axis arranged substantially perpendicular to a longitudinal direction of said vehicle.

18. The method of claim 16, wherein said providing includes providing said mechanism including a second device for rotating said display between said second position facing rearward and, a third position facing frontward using a support axis arranged substantially perpendicular to the ceiling of said vehicle.

* * * * *